United States Patent Office 3,421,342
Patented Jan. 14, 1969

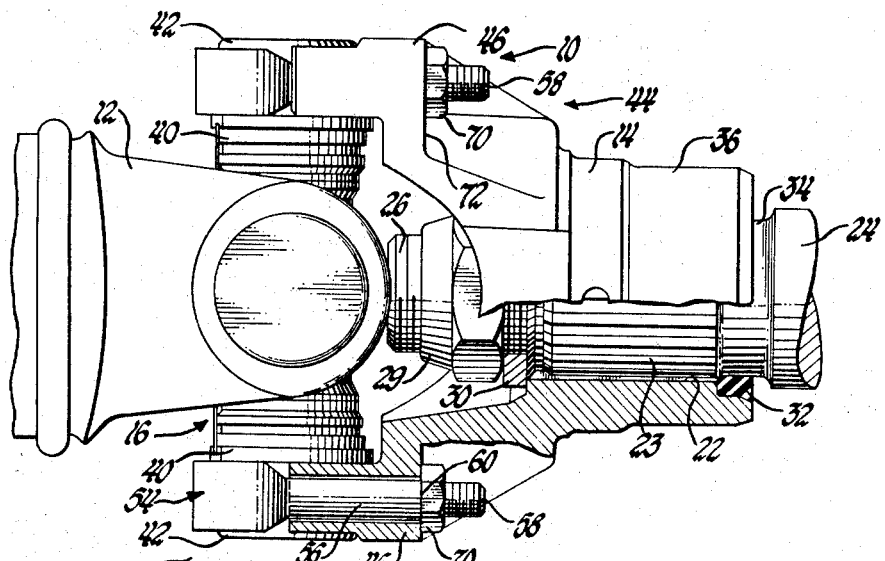

3,421,342
UNIVERSAL JOINT CLAMP
William A. Rossiter, Lapeer, Mich., assignor to General Motors Corporation, Detroit, Mich., a corporation of Delaware
Filed Jan. 3, 1967, Ser. No. 606,917
U.S. Cl. 64—17          5 Claims
Int. Cl. F16d 3/26

ABSTRACT OF THE DISCLOSURE

A clamp for securing a universal joint bearing cup to a yoke includes a spring portion engaging the bearing cup and a pair of legs which extend through the yoke. Nuts threaded on the legs are engageable with shoulders on the legs and with a surface of the yoke to locate the clamp with respect to the yoke and limit the force supplied by the spring portion of the clamp to a predetermined amount.

---

This invention relates generally to universal joints and more specifically to a clamp for clamping a spider to a driving member in a Cardan-type universal joint.

In conventional Cardan-type universal joints the spider is usually connected to one of the drive members by U-bolt type clamps and nuts. The clamps engage the bearing cups at the ends of the spider trunnions and clamp them to spaced seats in the drive member yoke. Since the bearing cups are relatively fragile, overtightening of the nuts on the U-bolts can cause crushing of the bearing cups and consequent damage to the bearings and to the universal joint.

This invention solves this problem by providing an improved clamp which limits the clamping force applied to the bearing cups, thus preventing damage to the bearing cups and to the bearings.

The primary feature of this invention is that it provides a clamp for clamping a universal joint trunnion bearing cup to a drive member yoke and including means for limiting the clamp force exerted by the clamp on the bearing cup.

Another feature is that the limiting means include a resilient portion for engaging the bearing cup and securing means for securing the resilient portion in predetermined relationship to the yoke to limit the force applied by the resilient portion to the bearing cup.

Yet another feature is that the clamp includes a pair of threaded legs and the securing means include bolts threaded on the legs into engagement with stop means on the legs and bearing against the yoke to apply a limited force through the resilient portion to clamp the bearing cup to the yoke.

Still another feature is that the resilient portion includes an arcuate center portion engaging the bearing cup and a pair of loop portions interconnecting the center portion with the legs to provide resiliency.

These and other features of this invention will become readily apparent upon reference to the following detailed description of the attached drawings in which:

FIGURE 1 is a partially broken away plan view of a Cardan-type universal joint employing clamps according to this invention;

FIGURE 2 is a partially broken away view similar to FIGURE 1 showing the universal joint in a 90° rotated position; and FIGURE 3 is an exploded partial perspective view.

Referring now to FIGURE 1 of the drawings, a Cardan-type universal joint 10 includes a pair of drive members 12 and 14 which are mutually interconnected by a spider 16. Drive member 14 is internally splined at 22 to receive a splined portion 23 of a rear axle input shaft 24. Shaft 24 has a threaded end portion 26 which receives a nut 29 that engages an interposed washer 30 to retain shaft 24 to drive member 14. A sealing member 32 is interposed between a reduced neck portion 34 of shaft 24 and collar 36 of drive member 14.

Spider 16 includes a pair of like opposed trunnions 38 which are conventionally attached to drive member 12. The spider includes another pair of like opposed trunnions 40 disposed normally to trunnions 38. Each trunnion 40 includes a bearing assembly (not shown) carried by a bearing race or cup 42. Drive member 14 includes a yoke 44 formed by a pair of like spaced anges 46, each having a semicylindrical seat or recess 48, and a cylindrical bore 50 on either side of the recess.

Each bearing cup 42 seats in a respective recess 48 and is retained therein by a clamp 54, according to this invention, to drivingly connect spider 16 to yoke 44. As shown in FIGURES 2 and 3, each clamp 54 includes a pair of mounting legs 56 each having a threaded end portion 58 that terminates in a stop or shoulder 60. Legs 56 are interconnected by a resilient portion or leaf spring segment 64 including an arcuate center portion 66 and loop end portions 68 which connect portion 66 to legs 56.

Bearing cups 42 are seated within recesses 48 and are engaged by the clamp center portion 66, with legs 56 extending through bores 50. A nut 70 is threaded onto each leg portion 58 and into engagement with the rear surface 72 of flange 46. The nuts are tightened until they engage shoulders 60, which prevent further tightening of the nuts. The nuts and shoulders thus locate the clamps in a predetermined position on flanges 46 in which resilient portion 64 exerts a limited force to clamp bearing cups 42 to flanges 46.

Thus the bearing cups are clamped by a limited force which is sufficiently large to provide an effective driving connection, but is limited to prevent crushing of the bearing cups and consequent damage to the trunnion bearings. The clamping force is suitably chosen for a given joint design and may be varied by varying the resiliency of segment 64 and, to a lesser degree, the location of stops 60.

While only a preferred embodiment of this invention has been shown and described, further modifications will become obvious to the routineer and are contemplated within the scope of this invention.

I claim:
1. In combination with a universal joint having a drive member, a spider assembly including a trunnion, a bearing cup and bearings interposed therebetween, and a clamping device for clamping the bearing cup to the drive member to drivingly interconnect the spider and the drive member, the improvement comprising a mounting portion on the clamping device, a clamping portion resiliently connected to the mounting portion for engaging the bearing cup, and means for locating the mounting portion in a predetermined position on the drive member to limit the resilient clamping force applied to the bearing cup to a predetermined amount.

2. The combination of claim 1, wherein the clamping portion is in the form of a spring.

3. The combination of claim 1, wherein the mounting portion includes a pair of legs, and the locating means include securing means for adjustably securing the legs to the drive member, a stop surface on the drive member engageable by the securing means, and stop means on the legs cooperable with the securing means to locate the legs relative to the drive member stop surface.

4. The combination of claim 3, wherein the clamping portion is in the form of a spring connected to the legs.

5. The combination of claim 4, wherein the spring is in the form of a band comprising an arcuate intermediate portion engaging the bearing cup and resilient outer loop portions connecting the intermediate portion to the legs.

References Cited

UNITED STATES PATENTS

| | | | |
|---|---|---|---|
| 2,124,803 | 7/1938 | Wollner | 64—17 |
| 2,132,816 | 10/1938 | Wollner | 64—17 |
| 2,171,313 | 8/1939 | Pearce | 64—17 |
| 2,253,300 | 8/1941 | Karlberg | 64—17 |

HALL C. COE, *Primary Examiner.*

U.S. Cl. X.R.

308—26